INVENTOR
Gunnar Torbjörn Löfgren

ATTYS.

United States Patent Office 3,487,996
Patented Jan. 6, 1970

1

3,487,996
METHOD AND SYSTEM FOR CONTROL OF THE SUPPLY OF FLOWING MEDIA TO AN OUTLET
Gunnar Torbjörn Löfgren, Djursholm, Sweden, assignor to Torbjorn Lofgren Forsaljningsaktiebolag, Stockholm, Sweden, a corporation of Sweden
Filed Jan. 26, 1968, Ser. No. 700,883
Claims priority, application Sweden, Feb. 1, 1967, 1,413/67; May 19, 1967, 7,072/67
Int. Cl. F16k 19/00
U.S. Cl. 236—12       16 Claims

ABSTRACT OF THE DISCLOSURE

This invention pertains to a method and apparatus for controlling the flow of two liquids in a pulsating manner for discharge through a common outlet. A pair of valve means are sequentially operated in response to a multivibrator circuit. Connected to the multivibrator circuit is a blocking circuit which disables the multivibrator circuit to stop the sequential pulsing of the valve means and cause energization of only one of the valve means for a predetermined period of time.

---

It is often desirable to be able to control automatically e.g. the proportions in which two or more flowing media are mixed. For instance, when mixing hot and cold water a so-called mixer is often used, which usually comprises a double valve in which the discharge ports for the hot and cold water are both, for instance, servocontrollable, for obtaining the desired mixing proportions. However, this solution does not satisfy requirements on instantaneous changes in said proportions, and does not permit rapid pulsation of e.g. one of the flowing media, which from certain technical aspects may be desirable.

The present invention is directed to a method and an arrangement which satisfy highly placed requirements on precision in mixture and/or intermittent flow, i.e. pulsation of the discharged flowing medium.

Figure 1:
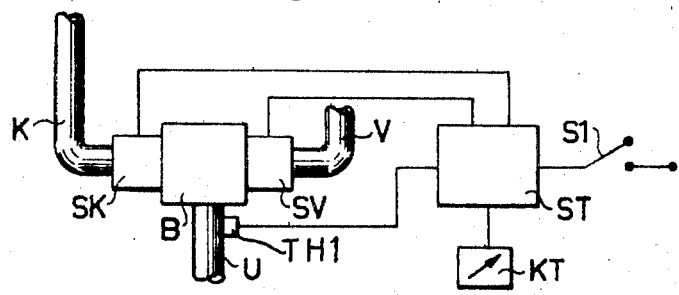
Figure 2:
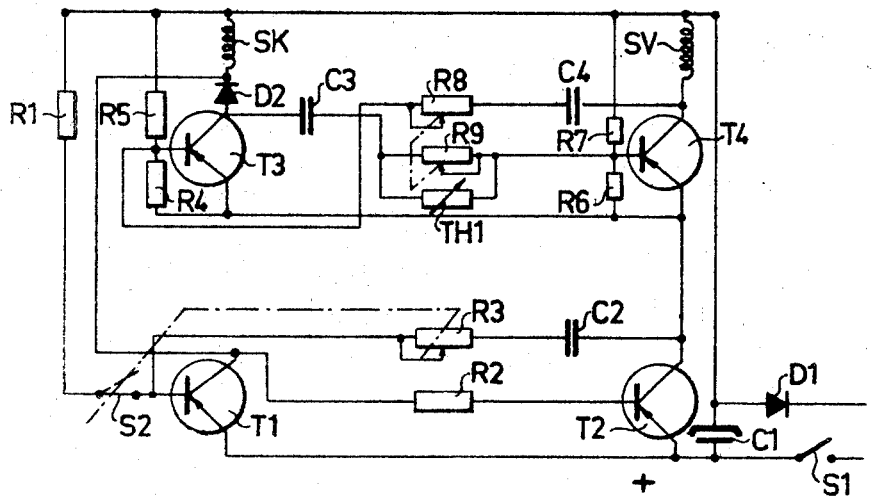
Figure 3:
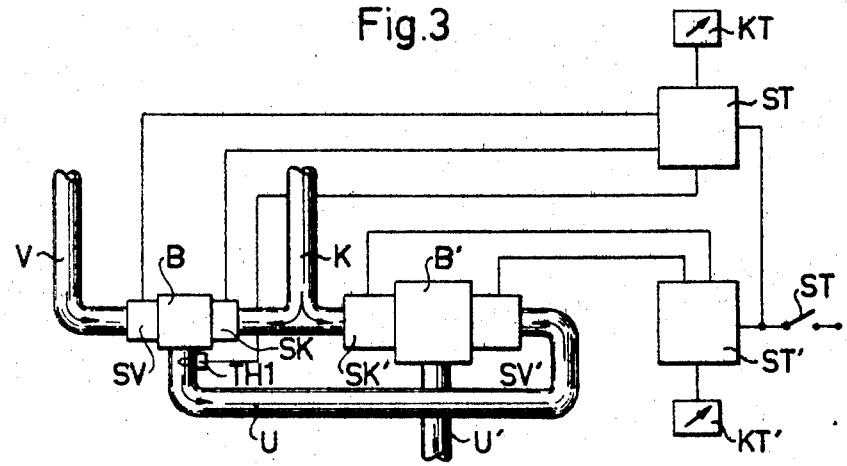
Figure 4:
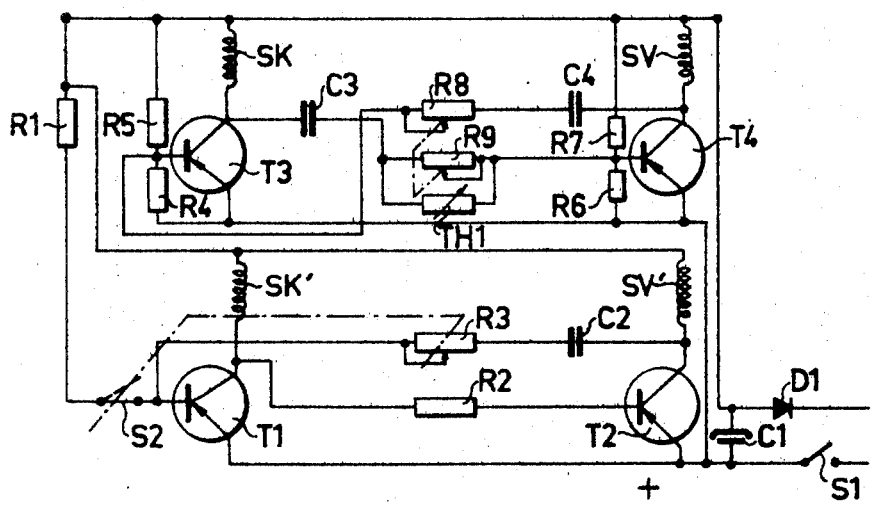

FIGURE 1 is a block diagram showing an embodiment of the invention for mixing hot and cold water and simultaneously to pulsate cold water automatically in shower systems, to provide so-called impulse showering. FIGURE 2 is a circuit diagram which shows the electric circuit of the elements included in FIGURE 1, and FIGURES 3 and 4 show a further example of a modified embodiment.

The arrangement shown in FIGURE 1 comprises two magnetic valves SK and SV connected to a cold and a hot water conduit K and V respectively. The outlets of the magnetic valves are in direct communication with a small mixing chamber B provided with an outlet conduit U. The outlets of the magnetic valves in the mixing chamber are directed towards one another in order to provide a turbulent mixture. Positioned in the outlet conduit is a temperature sensing means TH1 electrically connected with an electronic control unit ST. Also electrically connected with the control unit are said magnetic valves SK and SV, as well as a control unit KT including means for regulating the proportions in which the flowing media are mixed and the degree of pulsation, this feature being described in more detail below. The control unit ST is connected by a switch S1 with a suitable power supply.

The magnetic valves SK and SV are of the type generally designated indirect action or pilot operated valves. A typical valve of this designation is provided with a small relief channel in the valve cone proper (not shown), the channel in turn being arranged to be opened and closed by a piston actuated by a solenoid. The line pressure is utilized to provide the necessary sealing pressure on the valve cone in its closed position. When the

2 electrical operating coil which actuates said piston is energized the relief channel is opened and the pressure on the high pressure side of the valve cone is transferred to the outlet side of the valve. This results in an unbalanced pressure relationship, and the valve cone lifts, whereupon the main through-flow channel is opened. Such valves only require a small electromagnetic operating force in their operation, and are thus admirably suited for cooperative connection with electronic control circuits. Furthermore, the reaction period on time for these valves is particularly short from, for instance, closed position to open position, in practice down to 0.1 second. This type of magnetic valve is known per se.

In so-called impulse or pulsating shower treatment the bather is subjected to jets of temperature-controlled water, interrupted by short or long intervals of cold water. These intervals may by means of the invention be so divided that the temperature-controlled water is released for a period of two seconds, followed by an interval of cold water for one-half second, followed by a further interval of two seconds of temperature-controlled water etc. It has been found desirable to arrange for a fixed interval of temperature-controlled water, while the cold water interval is varied according to requirements. In order to show how the above discussed mixture and pulsation of the flowing media is obtained the circuit arrangement and function of the control units ST and KT, together with the magnetic valves SK and SV will now be discussed in more detail with reference to FIGURE 2. The chamber B must be of sufficiently small size such that the temperature of the water discharged during the cold water intervals is not significantly influenced by remaining temperature-controlled water in said chamber.

The circuit arrangement shown in FIGURE 2 includes four transistors T1–T4. The transistors are connected to a DC power supply via a rectifier D1 in one line and via the switch S1 in the other line. A filter capacitor C1 is connected in a known manner between the lines and in series with the rectifier D1 and the switch S1. The switch line is the positive line and is connected directly to the emitters of the transistors T1 and T2. The negative line is connected directly with one terminal of the coils of the two magnetic valves SK and SV, the other terminal of the coils being connected with the collectors of the transistors T3 and T4, the coil of the magnet valve SK being so connected via a diode D2. The emitters of the transistors T3 and T4 are both connected to the collector of the transistor T2, the collector also being connected, via a capacitor C2, in series with an adjustable resistor R3, with the base of the transistor T1. The base of the transistor T2 is connected through a resistor R2 to the collector of the transistor T1 and to the junction between the diode D2 and the coil of the magnetic valve SK. The base of the transistor T1 is also connected, through a switch S2 and a resistor R1, with the negative line. The switch S2 is ganged with the wiper of the adjustable resistance R3, so that the switch opens at the lowest resistance value. Current balance resistors R4, R5 and R6, R7, for respective bases of the transistors T3 and T4 are connected in a known manner to the transistor bases and to the supply lines of the transistors. The collector of the transistor T3 is connected, via a capacitor C3 and a variable resistor R9, with the base of the transistor T4. The temperature sensing means TH1, in the present embodiment being a resistance which varies with temperature, a so-called thermistor, is connected across the resistor R9. The collector of the transistor T4 is connected, via a capacitor C4 and a variable resistor R8, to the base of the transistor T3. The wipers of the resistors R8 and R9 are adjustable and ganged together so that they function in opposite senses. In general terms it can be said that the transistors T3 and T4 together form a bistable multivibrator. The circuit described above functions in the following manner, it being assumed that the switches S1 and S2 are closed and that the capacitor C2 is uncharged.

The transistor T1 becomes conductive upon closing of the switch S1. The transistor T1 does not obtain full current at this moment, but sufficient to set the multivibrator into operation. Immediately when the transistor T1 becomes conductive, a positive voltage appears on its collector, and the coil of the magnetic valve SK is energized, whereupon it is brought into function. The base of the transistor T2 obtains by the positive voltage on the collector of the transistor T1 such a bias via the resistor R2 that the transistor T3 becomes non-conductive. The capacitor C2 is now charged since the transistor T1 draws base current, and subsequently a positive voltage appears on the base, whereupon the capacitor C2 is charged via the transistor T4 and the coil of the magnetic valve SV. The time taken to charge the capacitor C2 is adjustable by the adjustable resistor R3. In that the positive voltage on the base of the transistor T1 increases due to the charging of the capacitor C2, the said base is blocked and becomes non-conducting upon a certain charging state of the capacitor C2. Hence, the collector of the transistor T1 adopts a negative potential, as does the base of transistor T2 through the resistor R2, whereupon the transistor T2 immediately becomes non-conductive. The two transistors T3 and T4 are then supplied with working voltage. It is assumed that the resistances R8 and R9 are set to their mean positions and that the existing charging states of the capacitors C3 and C4 are such that the transistor T3 is conductive first. The collector of the transistor T3 increases in voltage in a positive direction, whereupon current passes simultaneously through the coil of the magnetic valve SK and the capacitor C3 is charged positively; the charging current through the resistors R9 and R7 create a positive potential on the base of the transistor T4 so that said transistor remains non-conducting during the charging sequence. Upon completion of the charging sequence, the base of the transistor T4 returns to a normal voltage, at which the transistor T4 becomes conductive. Current flows through the transistor T4, and thus through the coil of the magnetic valve SV; the coil thus actuates the magnetic valve to open position. At the same time the voltage rises on the collector of the transistor T4 in a positive direction; the capacitor C4 is thus charged positively and the charging current passes through the resistors R8 and R5, whereby the base voltage of the transistor T3 increases in a positive direction and causes blocking of the transistor T3 so that it becomes non-conducting. The current then ceases through the coil of the magnetic valve SK and the collector of the transistor T3 adopts negative potential, which means that the capacitor C3 is discharged, whereupon the base potential of the transistor T4 passes further in a negative direction, the transistor T4 remaining in a conductive state and the magnetic valve SV energized. As soon as the charging current of the capacitor C4 ceases to flow through the resistors R8 and R5, the base of the transistor T3 returns to its normal voltage, at which the transistor T3 becomes conductive, whereupon the collector voltage of the transistor T3 increases once more and the capacitor C3 is recharged positively and current flows through the coil of the magnetic valve SK, and the sequence is repeated.

As can be seen there exists a certain overlapping between the energizing and deenergizing of the two magnetic valves, which is advantageous in practice for producing the desired mixing of the liquids. The resistors R8 and R9 determine both the charging and discharging times for the capacitors C3 and C4, the thermistor TH1 also taking part in the sequence so that if the heat in the outlet conduit is too high the charging and discharging times of the capacitor C3 are of longer duration, owing to the increased resistance of the thermistor TH1, which results in longer time intervals for the actuation of the magnetic valve SK than for the actuation of the magnetic valve SV. By adjusting the settings of the two resistors R8 and R9, it is possible to adjust the desired mixing proportions and temperature of the outflowing water. The thermistor TH1 may naturally be so adjusted that it only comes into operation at temperatures above a dangerous level.

It should be noted that the switching frequency of the transistors T3 and T4 is relatively high, which means that the magnetic valves SK and SV in practice are not able to complete a full opening and closing movement but that these constantly fluctuate around certain intermediate positions, closer to or more remote from respective closing positions. This valve function has the advantage that no switch shock waves or water hammer effects occur in the liquid supply system during the operation of the arrangement.

During the time taken for the transistors T3 and T4 to effect a number of oscillating periods, the capacitor C2 has begun to charge, and charging currents flow through the resistors R3 and R1, whereupon the base potential of the transistor T1 has passed in a positive direction and thus caused blocking of the transistor T1. Upon completion of the charging sequence of the capacitor C2 the base of the transistor T1 returns to negative potential due to the connection through the resistance R1. The ransistor T1 thus becomes conductive once more which results in that the coil of the magnetic valve SK is energized, and said magnetic valve opens completely while the transistor T2 is blocked and made non-conductive, supply of current to the transistors T3 and T4 ceasing. Thus, during the following interval only cold water is supplied to the outlet conduit U because the magnetic valve SK remains energized. However, the capacitor C2 is discharged during this period and charged to opposite polarity, whereas the base of the transistor T1 draws base current. When the charging sequence for the capacitor C2 has progressed to a state in which blocking voltage appears at the base of the transistor T1, the said base becomes non-conductive, whereupon current to the coil of the magnetic valve SK ceases momentarily and the transistor T2 becomes conductive and supplies the transistors T3 and T4 with current, the said transistors beginning to oscillate in the manner described above.

Thus, by means of the above described arrangement, an essentially continuous supply of temperature-controlled water is obtained during specific intervals which are interrupted by long or short intervals of cold water, depending on the charging and discharging periods for the capacitor C2, set by means of the resistor R3. If the resistor R3 is adjusted to its lowest resistance value, the switch S2 is actuated, whereupon the current path between the base of the transistor T1 and the resistor R1 is broken. This means that the base of the transistor T1 obtains such potential that the transistor T2 conducts and continuously supplies the transistors T3 and T4 with current, whereupon these oscillate in the described manner. No pulsation of cold water takes place in the last mentioned state. The reason for the arrangement of the diode D2 is as follows. When the transistor T1 is conductive, no voltage is supplied to the emitters of the transistors T3 and T4. This means that negative potential is transferred via the coil of the magnetic valve SV to the emitters of transistors T4 and T3. The diode D2 is included as a block in the collector circuit of the transistor T3, to prevent damaging of the transistors due to the positive voltage existing across the coil of the magnetic valve SK.

The above described control of the circuit of the magnetic valves affords a suitable and easily operated mixing arrangement which is very flexible with respect to the fields in which it may be used. As will be understood from the aforegoing, only the coupling including the transistors T3 and T4 need be used to provide the required mixing proportions of flowing media; it is possible to omit the thermistor TH1 or replace the same with, for instance, viscosity sensing means or the like.

According to the present invention mixing of the flowing media and pulsation of the cold medium can be controlled separately. Such a system is described below with reference to FIGURES 3 and 4.

The embodiment of FIGURE 3 includes all of the structure of the embodiment of FIGURE 1. In addition, the outlet conduit U from the mixing chamber B is connected to a further magnetic valve SV', which is in direct communication with a further mixing chamber B', to which is also connected a magnetic valve SK', for cold water and is, as shown, connected to a branch of the cold water conduit K. The mixing chamber B' is provided with an outlet U'. The magnetic valves SV' and SK' are electrically connected with a control unit ST', which in turn is connected with a control unit KT'. The control unit ST and control unit KT include couplings containing the transistors T3 and T4, as shown in FIGURE 2, and the control unit ST' and the control unit KT' contain couplings such as the transistors T1 and T2 in FIGURE 2. The control units ST and ST' are commonly connected to a suitable source of current by a switch S1.

The electric circuit for the control units ST and ST' and the control units KT and KT' will now be described with reference to FIGURE 4. Corresponding details in FIGURE 2 and FIGURE 4 are identified by the same reference numerals. The transistors T1 and T2 form a coupling completely separate from the transistors T3 and T4. The structure of FIGURE 4 is that of FIGURE 2, but omitting the diode D2 and the line therefrom to the collector of the transistor T1. In place thereof, the coils of the additional magnetic valves SK' and SV' are respectively connected between the collectors of the transistors T1, T2 and the negative lines. As a result the transistors T1 and T2 only regulate the flow of cold water in the system.

In short the system functions in the following manner. Upon energizing the switch KS1 the two transistors T3 and T4 are supplied directly with working voltage, these transistors oscillating in the manner described in connection with FIGURE 2. Thus, the magnetic valves SK and SV supply water through the mixer B, controlled to a temperature determined by the settings of the resistances R8 and R9. At the same time as the switch S1 is energized the transistors T1 and T2 are also energized, the said transistors being alternately caused to become conductive and non-conductive. By connecting the additional magnetic valves SK' and SV' in the collector circuits of the transistors T1 and T2, respectively, the said transistors actuate said valves directly in their conductive and non-conductive state; the energizing periods for respective magnetic valves SK' and SV' determine the pulsating intervals for temperature-controlled water from the outlet conduit U and the cold water from the conduit K. As in the circuit according to FIGURE 2, the time taken to charge the capacitor C2, and hence intervals, can be regulated by the setting of the adjustable resistor R3. The system of FIGURE 4 may be preferred in some instances, especially in the case of large shower system or other technical instances where equivalent processing of flowing media is desired.

The invention is not restricted to the illustrated systems for mixing and pulsating flowing media, but can also be adapted for only mixing two or more flowing media without pulsating the supplied media during predetermined intervals. Further, it is usual to connect one or more safety thermostats (not shown) in the conduits for hot water or the mixed water, to prevent damage to both material and persons. According to this invention, magnetic valves are used which have extremely short reaction periods, or else the operating pulses are equal to or longer than the reaction times of the magnetic valves.

What is claimed is:
1. A method of controlling the flow of fluid from two inlets to a single outlet, comprising:
    (a) automatically pulsing the flow of one fluid through alternate on and off states during a first predetermined period of time;
    (b) automatically pulsing the flow of the other fluid through alternate on and off states opposite to that of said first fluid during said first predetermined period of time;
    (c) mixing the two pulsing fluids in a variable predetermined ratio;
    (d) stopping the pulsing of said fluid for a second predetermined period of time; and
    (e) flowing only one of said fluids during said second predetermined period of time.

2. A method of controlling the flow of fluids according to claim 1, wherein the average volumetric rate of flow of mixed pulsing fluids is substantially equal to the maximum volumetric rate of flow of the pulsing fluids.

3. A method of controlling the flow of fluid according to claim 1, wherein the average volumetric rate of flow of the mixed fluids is less than the maximum volumetric rate of flow of the pulsing fluids.

4. A method of controlling the flow of fluid according to claim 1, including the step of positively partially overlapping the on and off state of the two fluids.

5. A method of controlling the flow of two fluids according to claim 4, including the step of sensing the temperature of the mixed fluid to control the duration of individual pulses of said one fluid to maintain the temperature of the mixed fluid within a predetermined range of temperatures.

6. A method of controlling the flow of two fluids according to claim 1, including the step of sensing the temperature of the mixed fluid to control the duration of individual pulses of said one fluid to maintain the temperature of the mixed fluid within a predetermined range of temperatures.

7. An apparatus for controlling the flow of fluid from two inlets to an outlet, comprising:
    (a) a first valve means connected to one of the inlets to control the flow of fluid therefrom;
    (b) a second valve means connected to the other of the inlets to control the flow of fluid therefrom;
    (c) a mixing chamber positioned in fluid communication between said first and second valve means for mixing together the fluid from the two inlets and delivering the mixed fluid to the outlet;
    (d) control means operatively connected to said first and second valve means to automatically alternately open and close the said first and second valve means to pulsate the fluid from the inlets into said mixing chamber during a first predetermined time interval; and
    (e) blocking means connected to said control means and to said first valve means for maintaining said first valve means energized and said second valve means deenergized during a second predetermined time interval after said first predetermined time interval.

8. An apparatus for controlling the flow of fluid according to claim 7, wherein said control means includes means for alternately opening and closing said first and second valve means in opposite senses one from the other.

9. An apparatus for controlling the flow of fluid according to claim 8, wherein said control means is arranged to effect opening of said first valve means in overlapping relation to the closing of said second valve means, and to effect opening of said second valve means in overlapping relation to the closing of said first valve means.

10. An apparatus for controlling the flow of fluid according to claim 7, wherein said first and second valve means are electrically operated magnetic valves having first and second energizing coils respectively, and wherein said control means and said blocking means are each electronic control circuits connected to one another and to said valve energizing coils for generating periodically and alternately short-duration pulses to operate said magnetic valve means to provide the mixed fluid.

11. An apparatus for controlling the flow of fluid according to claim 10, wherein said electronic control circuit of said control means includes:
 (a) a bistable multivibrator having first and second transistors connected in series with said first and second energizing coils respectively;
 (b) a first resistor-capacitor cross-coupling circuit from the output of said first transistor to the input of said second transistor; and
 (c) a second resistor-capacitor cross-coupling circuit connected from the output of said second transistor to the input of said first transistor, the resistor of at least one of said first and second cross-coupling circuits being adjustable.

12. An apparatus for controlling the flow of fluid according to claim 11, wherein the resistors of both said first and second cross-coupling circuits are adjustable and are ganged together so as to function in opposite senses.

13. An apparatus for controlling the flow of fluid according to claim 12, including a temperature responsive resistor connected in circuit with at least one of said first and second-coupling circuits and positioned adjacent the outlet for crossing the temperature of the fluid passing through the outlet.

14. An apparatus for controlling the flow of fluid according to claim 11, wherein said blocking means comprises two transistors, one transistor of said blocking means being connected to block the supply of current to said multivibrator and the other transistor of said blocking means being connected to energize said first energizing coil during said second predetermined time interval.

15. An apparatus for controlling the flow of fluid according to claim 7, including:
 (a) third valve means connected in fluid communication with said one of the inlets to control the flow of fluid therefrom;
 (b) fourth valve means connected in fluid communication with the outlet to receive the mixed fluid therefrom;
 (c) a mixing chamber positioned in fluid communication between said third and fourth valve means for mixing together the fluid from said third and fourth valve means and delivering the farther mixed fluid to a second outlet;
 (d) said third and fourth valve means being connected to said control means and to said blocking means, said third and fourth valve means being alternately openable and closable to pass the further mixed fluid and the fluid from said one of the inlets, one after the other, and to stop the flow of the further mixed fluid during said second predetermined time interval.

16. An apparatus for controlling the flow of fluid according to claim 7, wherein said blocking means is arranged to cycle to provide automatic repetition of said first and second predetermined time intervals.

References Cited

UNITED STATES PATENTS

| | | | |
|---|---|---|---|
| 2,607,202 | 8/1952 | Garland | 137—606 XR |
| 2,939,469 | 6/1960 | Kampf et al. | 137—3 |
| 2,949,109 | 8/1960 | Koolnis | 128—366 XR |
| 3,424,951 | 1/1969 | Barker | 137—1 XR |

ROBERT G. NILSON, Primary Examiner

U.S. Cl. X.R.

137—1, 606, 624.2, 624.15